(12) United States Patent
Kaminski et al.

(10) Patent No.: US 8,954,073 B2
(45) Date of Patent: Feb. 10, 2015

(54) TELECOMMUNICATION METHOD AND APPARATUS THEREOF

(75) Inventors: Stephen Kaminski, Eislingen (DE); Thorsten Wild, Stuttgart (DE); Hajo Bakker, Eberdingen (DE); Danish Aziz, Zuffenhausen (DE); Rolf Sigle, Remshalden (DE); Heidrun Grob-Lipski, Starzach (DE); Uwe Doetsch, Freudental (DE); Michael Schmidt, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 695 days.

(21) Appl. No.: 13/146,560

(22) PCT Filed: Jan. 29, 2010

(86) PCT No.: PCT/EP2010/000537
§ 371 (c)(1),
(2), (4) Date: Jul. 27, 2011

(87) PCT Pub. No.: WO2010/086172
PCT Pub. Date: Aug. 5, 2010

(65) Prior Publication Data
US 2011/0287805 A1    Nov. 24, 2011

(30) Foreign Application Priority Data
Jan. 29, 2009    (EP) .................................... 09290063

(51) Int. Cl.
*H04W 36/00* (2009.01)
*H04W 36/08* (2009.01)
*H04W 36/20* (2009.01)

(52) U.S. Cl.
CPC .............. *H04W 36/08* (2013.01); *H04W 36/20* (2013.01)
USPC .......................................... 455/436; 455/438

(58) Field of Classification Search
CPC ..... H04W 36/00; H04W 36/02; H04W 36/04; H04W 36/08; H04W 36/10; H04W 36/12; H04W 36/14; H04W 36/16; H04W 36/18; H04W 36/20; H04W 36/22; H04W 36/24; H04W 36/28; H04W 36/30; H04W 36/32; H04W 36/34; H04W 36/36; H04W 36/38; H04W 36/06
USPC ........ 455/422.1, 437–444; 370/328, 331–334
See application file for complete search history.

(56) References Cited

U.S. PATENT DOCUMENTS

| 6,633,554 | B1 * | 10/2003 | Dalal ............................ 370/331 |
| 2007/0047493 | A1 * | 3/2007 | Park et al. ..................... 370/331 |

(Continued)

FOREIGN PATENT DOCUMENTS

| JP | 2008533904 | 8/2008 |
| WO | 2006098665 A1 | 9/2006 |

(Continued)

OTHER PUBLICATIONS

English Bibliography for PCT Pat. App. Publication No. WO 2008/007437A1, Filed Jul. 14, 2006 in Japanese, Printed From Thompson Innovation on Feb. 6, 2013, 4 Pages.

(Continued)

*Primary Examiner* — Ajit Patel
(74) *Attorney, Agent, or Firm* — Fay Sharpe LLP

(57) ABSTRACT

The invention relates to a telecommunication method in a base station of a mobile communication system, the mobile communication system comprising a plurality of base stations, a communication link being established between the base station and a user equipment, the method comprising the following steps performed by the base station: selecting one of the plurality of base stations as a target base station for a handover of the user equipment; transmitting a handover request to the target base station; receiving a handover request acknowledgement from the target base station, the handover request acknowledgment being indicative of at least one physical resource of the target base station; and transmitting a handover command to the user equipment via the communication link using the at least one physical resource. The handover command being descriptive of information required for accessing the target base station.

13 Claims, 5 Drawing Sheets

(56) References Cited

U.S. PATENT DOCUMENTS

2008/0267131 A1* 10/2008 Kangude et al. ............. 370/331
2009/0124261 A1 5/2009 Shimomura
2012/0287909 A1* 11/2012 Ohta et al. .................... 370/331

FOREIGN PATENT DOCUMENTS

WO      2008/007437 A1    1/2008
WO   WO 2008/096240 A1    8/2008

OTHER PUBLICATIONS

R1-803574, 3GPP TSG-RAN1 Meeting #54bis, Draft CR on RNTI for UE-Specific Search Space, ASUSTeK, Prague, Czech Republic, Sep. 29-Oct. 3, 2008, 4 Pages.
English Bibliography for Japanese Patent App. Publication No. JP2008533904A, published Aug. 21, 2008, printed from Thomson Innovation on Jul. 18, 2013, 3 pp.
"Universal Mobile Telecommunications System (UMTS); Evolved Universal Terrestrial Radio Access (E-UTRA) and Evolved Universal Terrestrial Radio Access (E-TRAN); Overall description; Stage 2 (3GPP TS 36.300 version 8.5.0 Release 8; ETSI TS 136 300," ETSI Standard, European Telecommunications Standards Institute (ETSI), vol. 3-R2, No. V8.5.0, XP014042193, pp. 1-137, Jul. 1, 2008.
International Search Report for PCT/EP2010/000537.

* cited by examiner

TELECOMMUNICATION METHOD AND APPARATUS THEREOF

FIELD OF THE INVENTION

The invention relates to a telecommunication method for the allocation of physical resources in a base station of a mobile communication system, to a base station, to a mobile communication system and to a computer program product.

BACKGROUND AND RELATED ART

In a cellular network, a cell typically has several neighboring cells. The handover procedure allows the continuation of a call when a user equipment crosses the border of one cell to another. The basic concept of handover is that when a user terminal moves from the coverage area of one cell to another, a new connection to the target cell is set up and the connection to the old cell may be released. During the handover, data interruption may occur caused by delays in signaling message, or caused by problems during the signaling with the candidate base station and the source base station.

In general, when a user equipment moves from one cell to another in a cellular radio system and the handover is performed, the handover may be described as a hard handover or a soft handover. During the hard handover, the old connection is broken before a new one is set up. Therefore, handover margins are used in order to diminish the problem of data interruption. However, the base station connection cannot be utilized in such a case due to the handover margin and the delay of the handover procedure.

Further, a pilot signal is used to identify a base station and to form an active set in a mobile communication system. The pilot signal is continuously transmitted by each base station to beyond its service coverage area. The user equipment can identify the base stations on the basis of the pilot signal, since the signals differ from one another. The user equipments continuously measure pilot signals and maintain a measurement list of the base stations and the corresponding signal quality levels of the pilot signals that are situated near the user equipment and that are possible candidates for handover or connection establishment.

The base stations on the measurement list form a group of candidates that may become a serving base station. User equipments may monitor the pilot signals of only those base stations that are on the measurement list. When a user equipment moves, the measurement list is updated as the need arises. The updating process is performed according to the measurements of the user equipment based on the strength of the pilot signal, that is if a pilot signal transmitted by a base station is received with adequate strength, it is added to the measurement list. During the handover, interference during the transmission of the handover command may cause a handover failure.

SUMMARY OF THE INVENTION

The invention relates to a telecommunication method in a base station of a mobile communication system, the mobile communication system comprising a plurality of base stations, a communication link being established between the base station and a user equipment, the method comprising the following steps performed by the base station: selecting one of the plurality of base stations as a target base station for a handover of the user equipment; transmitting a handover request to the target base station; receiving a handover request acknowledgement from the target base station, the handover request acknowledgment being indicative of at least one physical resource of the target base station; and transmitting a handover command to the user equipment via the communication link using the at least one physical resource. The handover command being descriptive of information required for accessing the target base station.

The term 'base station' as used herein refers to any type of fixed network element capable of exchanging data with a user equipment. The term 'user equipment' as used herein refers to any type of fixed or mobile (or portable) communication terminal capable of exchanging data with a radio-communication network on a radio communication link. Consequently, it may be, among other things, a telephone or desktop computer connected to a local router or server and equipped with a radio communication interface; a mobile telephone; a laptop computer or personal digital assistant (or PDA) equipped with a radio communication interface; a server or local router equipped with a radio communication interface; a high-frequency radio receiver; or a terrestrial or satellite television receiver.

One of the advantages of the invention is that it reduces or eliminates the interference caused by neighboring base stations, and specially from the target base station from a handover, when transmitting the handover command to the user equipment. The correct transmission of the handover command is a critical step during the whole handover procedure, as it communicates the user equipment with all relevant information for completing the handover.

In accordance with an embodiment, the physical resource being at least one of frequency spectrum, time slot, physical resource block or antenna beam.

In accordance with an embodiment, the description of the first physical resources is decoded with a predefined algorithm from a temporary identifier of the user equipment.

In accordance with an embodiment, the predefined algorithm is determined during setup of the base station and the target base station, wherein the physical resource is a physical resource block, wherein the predefined algorithm decodes a first block position of the physical resource block in at least a predefined digit position from the temporary identifier.

In accordance with an embodiment, the predefined algorithm is a modulo operation with the temporary identifier.

In accordance with an embodiment, the physical resource is a physical resource block (PRB), wherein the physical resource block is transmitted by the target base station with reduced transmission power during the transmission of the handover command.

In accordance with an embodiment, the physical resource is a physical resource block (PRB), wherein the physical resource block is not transmitted by the target base station during the transmission of the handover command.

In accordance with an embodiment, the handover request acknowledgment is further indicative of a block position of the physical resource block, wherein the handover command is transmitted at the block position of the physical resource block.

In accordance with an embodiment, the physical resource is selected for minimizing interference with the target base station during the transmission of the handover command.

In accordance with an embodiment, the handover request comprises information of the physical resource to be used by the base station during transmission of the handover command, wherein the target base station uses the information for transmitting the physical resource with reduced transmission power during the transmission of the handover command.

In accordance with an embodiment, the handover request comprises information of the physical resources to be used by the base station for transmitting the handover command, wherein the target base station uses the information for not transmitting the physical resources during the transmission of the handover command.

In accordance with an embodiment, the mobile communication system is a frequency reuse-1 multi-carrier system.

In another aspect, the invention relates to a base station in accordance being operable to perform in accordance with any of the preceding embodiments.

In another aspect, the invention relates to a telecommunication method in a mobile communication system, the mobile communication system comprising a plurality of base stations, a communication link being established between a base station and a user equipment, comprising:

selecting one of the plurality of base stations as a target base station for a handover of the user equipment by the base station;
  transmitting a handover request to the target base station by the base station;
  encoding a description of at least one physical resource of the target base station with a predefined algorithm in a temporary identifier of a user equipment by the target base station;
  transmitting a handover request acknowledgement to the base station, the handover request acknowledgment comprising the temporary identifier of the user equipment;
  transmitting a handover command to the user equipment by the base station via the communication link using the at least one physical resource, the handover command being descriptive of information required for accessing the target base station.

In another aspect, the invention relates to a computer program product stored on a storage medium, comprising executable program means for causing a base station to perform a method according to any of the preceding embodiments when the program is run on the base station.

BRIEF DESCRIPTION OF THE DRAWINGS

In the following preferred embodiments of the invention will be described in greater detail by way of example only making reference to the drawings in which.

DETAILED DESCRIPTION

Figure 1:
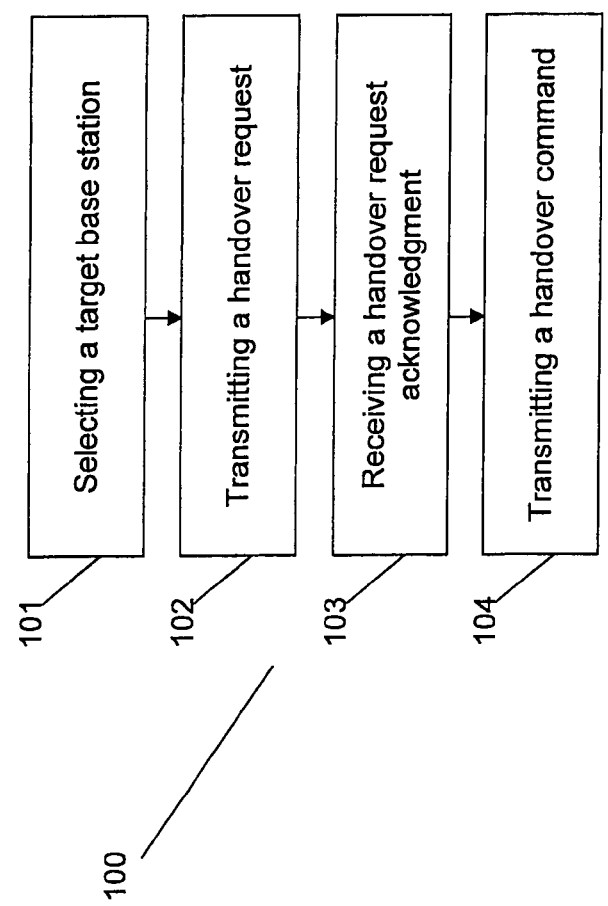
FIG. 1 shows a flow diagram of an embodiment of a telecommunication method in a base station of a mobile communication system.

FIG. 1 shows a flowchart 100 of a telecommunication method in a base station of a mobile communication system. The mobile communication system comprises a plurality of base stations, and a telecommunication link is established between the base station and a user equipment. In a first step 101, one of the plurality of base stations is selected as a target base station for a handover of the user equipment. In a second step 102, a handover request is transmitted to the target base station. In a third step 103, a handover request acknowledgement is received from the target base station. The handover request acknowledgement is indicative of at least one physical resource of the target base station. In a fourth step 104, a handover command is transmitted to the user equipment via the telecommunication link. The transmission of the handover command uses the physical resource. The handover command is descriptive of information required for accessing the target base station.

Further, the physical resources indication may correspond to one or more of:
  physical resource blocks
  location information of the user equipment
  beam in which the user equipment is located
  Channel State Information (CSI) of the user equipment, including Channel quality indicator (CQI), precoding matrix index (PMI), or Rank indicator (RI).

Figure 2:
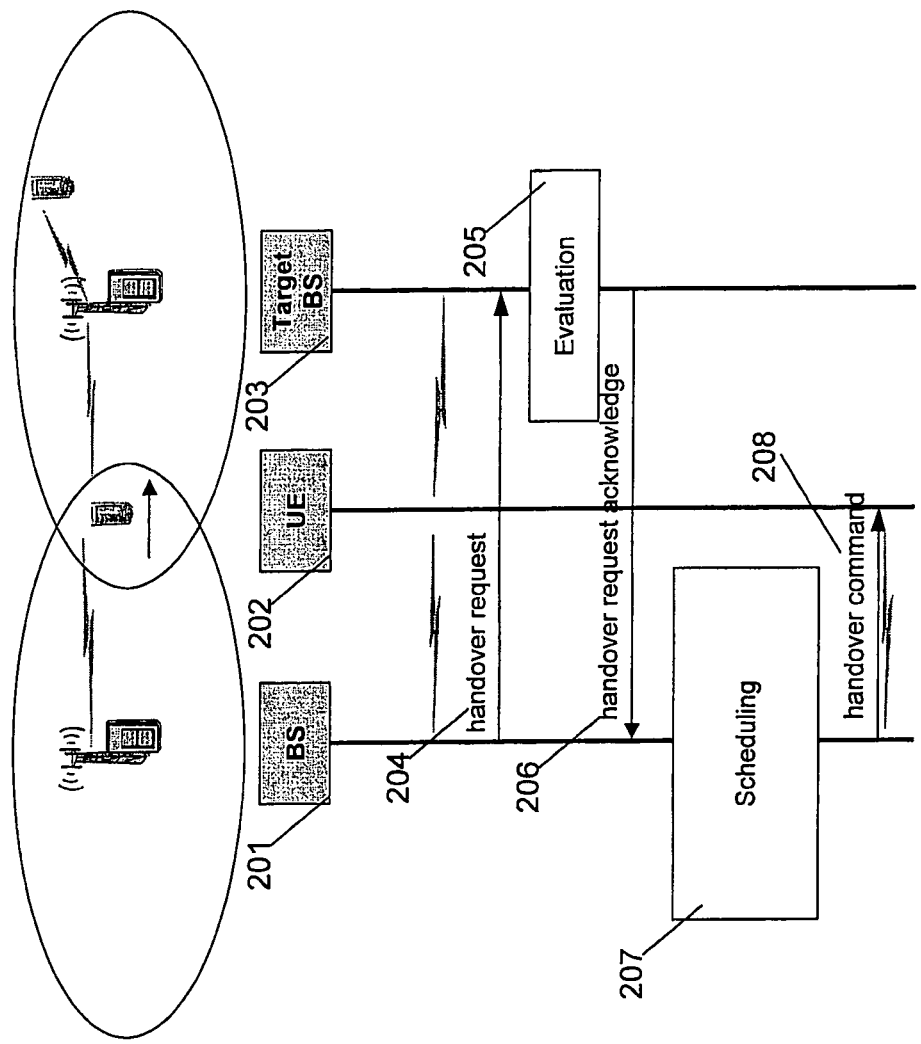
FIG. 2 illustrates an embodiment of the signaling during the telecommunication method.

FIG. 2 shows a signaling between a base station 201, a user equipment 202 and a target base station 203 during a handover procedure in a mobile communication system.

The user equipment 202 continuously transmits measurement report to the base station 201, which corresponds to the base station with an established link with the user equipment 202. The base station 201 organizes a candidate list of base stations with the information received in the measurement report. The measurement report may indicate or trigger a handover to a candidate base station. A target base station 203 for a handover of the user equipment 202 is selected from a candidate list of base stations. After the candidate base station for the handover has been selected, the base station 201 transmits a handover request 204 to the target base station 203.

Then, the target base station 203 receives the handover request 204 and makes an evaluation 205 of the resources availability of the target base station 203 for the handover. The target base station 203 prepares the resources for the handover, which may include a temporary identifier of the user equipment 202 for accessing the target base station 203. Further, the target base station 203 accepts the handover and transmits a handover request acknowledgement 206 to the base station 203, the handover request acknowledgment 206 comprising the temporary identifier. The handover request acknowledgement 206 is indicative of at least one physical resource of the target base station 203. The physical resource may be: a frequency spectrum part, specific timeslots, specific beams of the target base station or physical resource blocks. The physical resource may be encoded into the temporary identifier.

After reception of the handover request acknowledgement 206, the base station 201 uses the information received from the physical resources of the target base station for scheduling 207 the physical resources to be used during the transmission of the handover command 208 to the user equipment 202. Then, the base station 201 transmits the handover command 208 to the user equipment 202 via the telecommunication link using the physical resource. The handover command is descriptive of the information required for accessing the target base station 203 by the user equipment 202.

During the transmission of the handover command 208 by the base station 201, the target base station 203 may transmit the physical resource powers with a reduced transmission power, or suspend the transmission of the physical resources during the time of the transmission of the handover command 208. By reducing the transmission power of the physical resources by the target base station, the interference that may cause the target base station 203 is reduced or minimized, so that the handover command 208 is received by the user equipment 202 with a reduced interference.

The information of the physical resources can be encoded into the handover request acknowledgement by using a predefined algorithm, or directly included into the handover request acknowledgement as an extension, or as a separate message. Further, it is possible that the base station 201 may command the target base station 203 to use specific physical resources with the reduced transmission power, or to stop using them for a period of time. The command may be transmitted within the handover request 204, or as a separate message from the base station 201 to the target base station 203.

Alternatively, the base station 201 may make a decision on what physical resources will be used during the transmission of the handover command 208. Then, the base station 201 may send a proposal to the target base station 203, which the target base station 203 may accept or refuse. In case that the target base station 203 refuses the proposal from the physical resources usage from the base station 201, the target base station 203 may transmit into the handover request acknowledgement, or in a separate message, the information of the selected physical resources to be used during the transmission of the handover command 208. The base station 201 will receive the handover request acknowledgement and may schedule new physical resources to be used during the transmission of the handover command, based on the information transmitted by the target base station 203.

Figure 3:
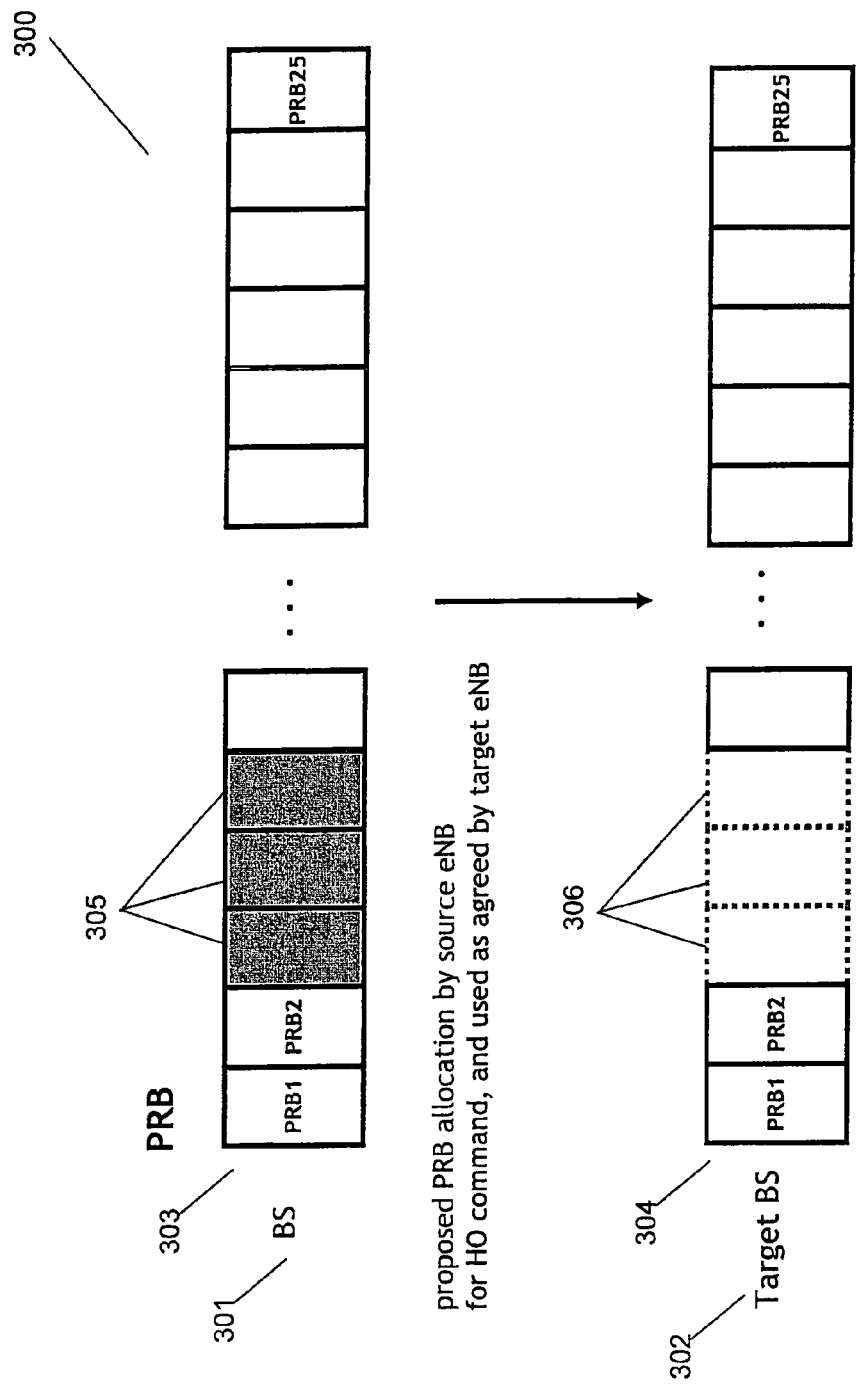
FIG. 3 illustrates an embodiment of the use of the physical resource blocks in the base station and the target base station.

FIG. 3 shows a block diagram 300 of the physical resources blocks to be used in the base station and in the target base station. The base station 301 and the target base station 302 may belong to a mobile communication system with a 5 MHz frequency spectrum with 25 physical resource blocks 303 on the base station and 25 physical resource blocks 304 on the target base station.

Within the set of physical resource blocks 303, the base station 301 selects three physical resource blocks 305, the physical resource block positions 3, 4 and 5, for transmitting the handover command to a user equipment. The proposed allocation of the handover command within the set of physical resource blocks is transmitted to the target base station 302 within the handover request, or as a separate message. The command may force the target base station 302 to reduce the transmission power in the selected positions of the physical resource blocks 306, in order to reduce or minimize the interference during the transmission of the handover command to the user equipment. In case that the target base station 302 is not forced to follow the command of the base station 301, the target base station 302 may or it may not reduce the transmission power of the selected physical resource blocks. In case that the target base station 302 refuses to accept the command, it will make a new selection of physical resource blocks and inform the base station 301 about the new selected resources.

Figure 4:
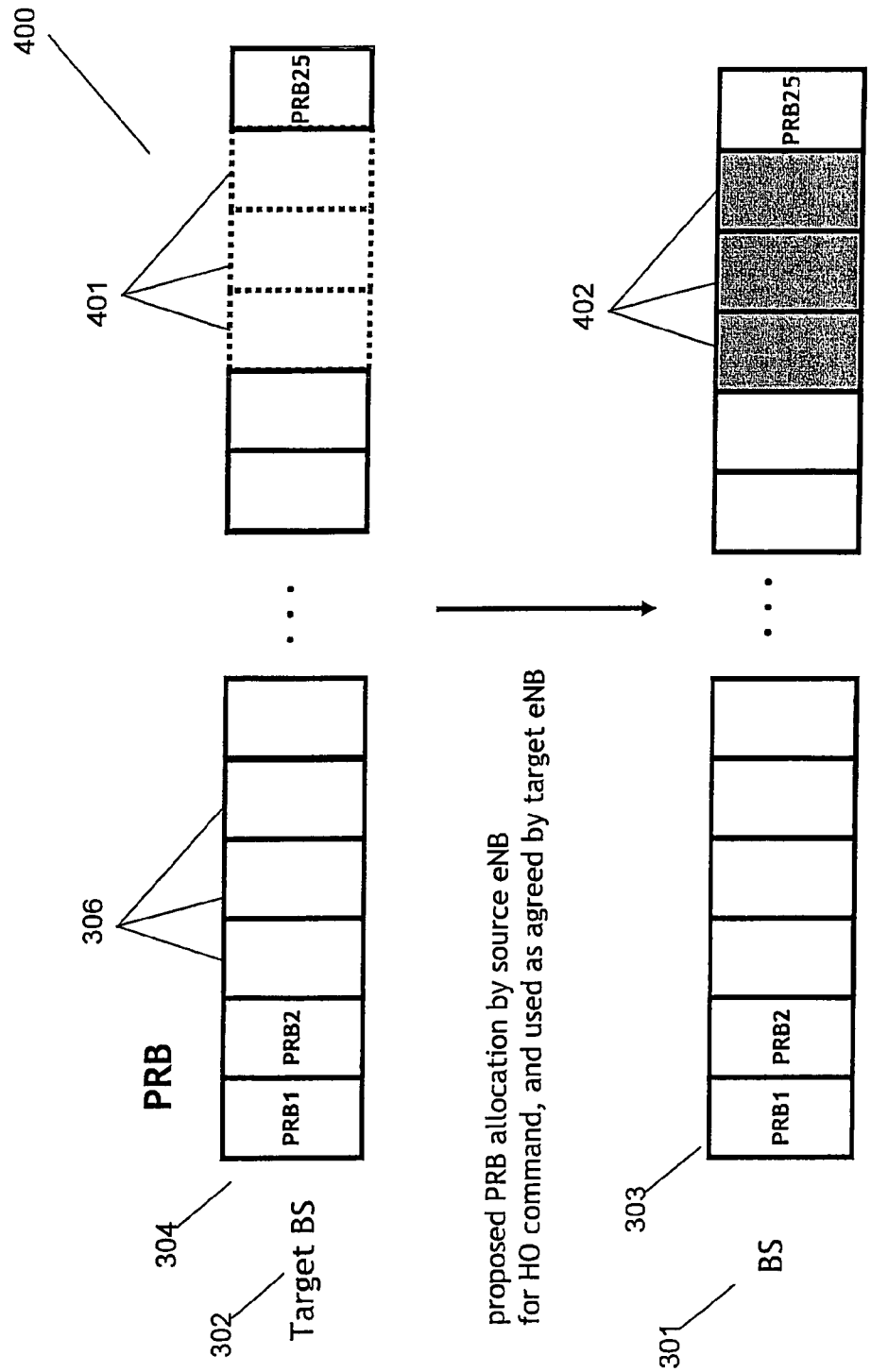
FIG. 4 shows an embodiment of the use of the physical resource blocks in a base station and a target base station of a mobile communication system.

FIG. 4 shows a block diagram 400 of the physical resource blocks 304 of a target base station 302 and the physical resource blocks 303 of a base station 301 in a mobile communication system. The block diagram 400 is a continuation of the block diagram 300. In the block diagram 400 the target base station 302 refuses the command transmitted by the base station 301 for at least reducing the transmission power of the physical resource blocks 306.

When the target base station 302 refuses to follow the command transmitted by the base station 301, the target base station 302 makes a new selection of physical resource blocks 401 in the block positions 22, 23 and 24, which will be transmitted with a reduced transmission power during the time that the handover command is sent to the user equipment by the base station 301. The new selection of physical resource blocks 401 is informed to the base station 301 within the handover request acknowledgement.

The information of the selection made by the target base station 302 may be encoded as part of the information that is sent within the handover request acknowledgement, or as an extension of the handover request acknowledgement. Alternatively, a separate message may be used to inform the base station 301 of the selection of the target base station 302. Finally, the base station 301 receives the information from the target base station 302 and may decide to update the previous selection of physical resource blocks to transmit the handover command, and allocate the handover command within the physical resource blocks 402, in order to minimize the interference with the target base station and increase the chances of a successful handover command transmission.

The information regarding the selection of the physical resources by the target base station 302 may be encoded within the temporary identifier of the user equipment, which is transmitted within the handover request acknowledgement. The information may be encoded within certain digits positions of the temporary identifier. Alternatively, the base station 301 may recalculate a starting position of the physical resource used by the target base station by calculating the remainder of the division between the temporary identifier and the starting position of the physical resource blocks. The remainder of this division will indicate what physical resources the target base station will not use or reuse with a reduced transmission power during the transmission of the handover command.

An example of the calculation assuming 5 MHz Bandwidth with 25 physical resource blocks, counting 0 to 24 may follow: The resources selected by the target base station to transmit the handover command by the base station comprises a set of 3 consecutive physical resource blocks (PRBs) may start at any position within the 25 PRBs. Thus, there are npos=23 possible starting positions from 0 to 22.

If the target base station selects resources in the PRB positions 13, 14 and 15, and using nstart=13, to the base station for the transmission of the handover command message. The target base station selects a new temporary identifier (e.g. C-RNTI) for the user equipment that is calculated as follows:

$$\text{New\_C-RNTI} = N * n\text{pos} + n\text{start}$$

With N as integer number, npos=23 and nstart=13, the possible C-RNTI values are e.g. 13, 36, 59, etc.

The base station can easily recalculate the starting position by calculating the remainder of the division with npos, i.e. the modulo operation with npos. If the target base station has signaled the new C-RNTI=482, the modulo calculation follows:

$$n\text{start} = \text{C-RNTI} \bmod n\text{pos} = 482 \bmod 23 = 22.$$

Figure 5:
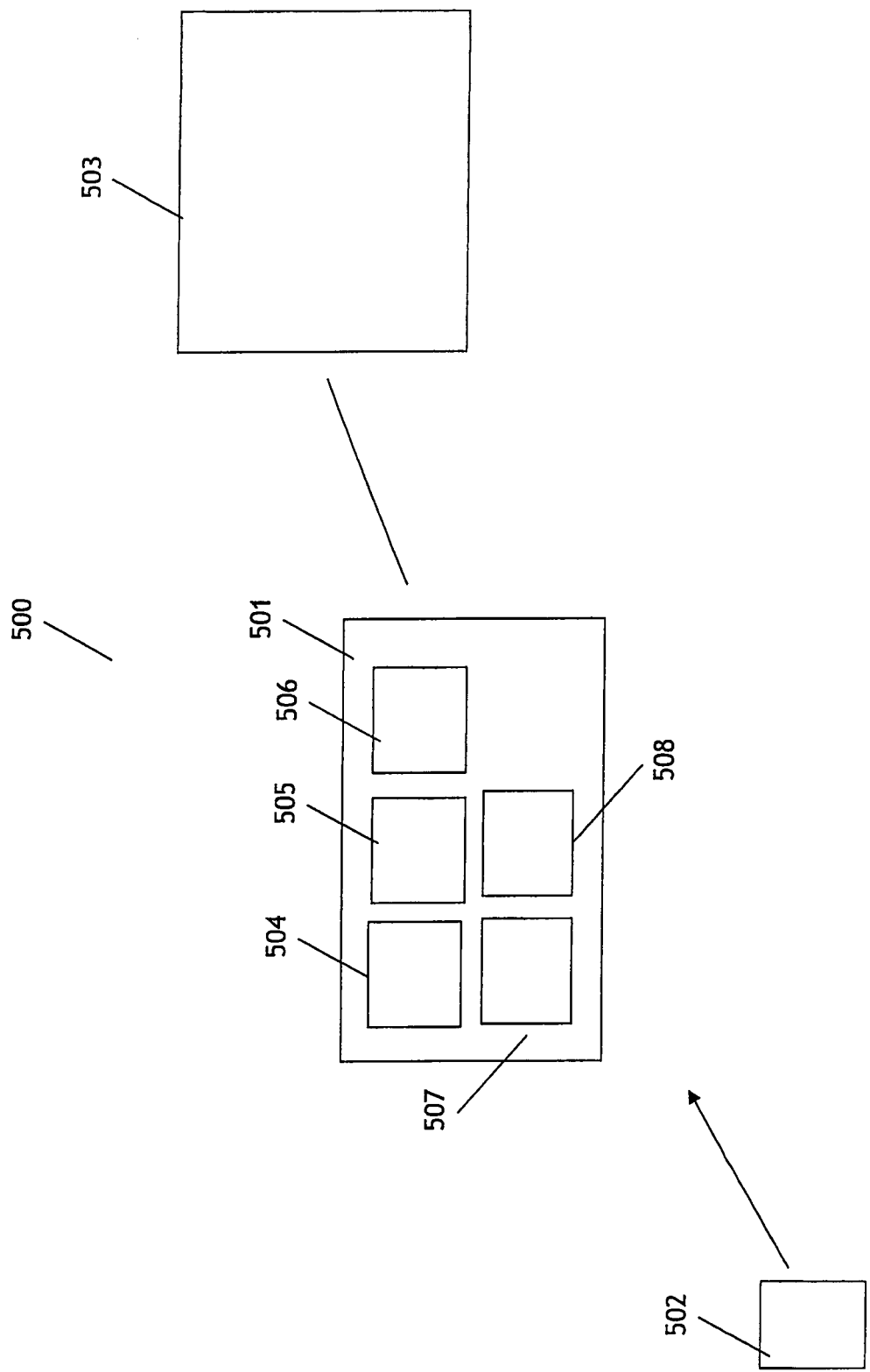
FIG. 5 illustrates a block diagram of a base station.

FIG. 5 shows a block diagram of a mobile communication system 500 comprising a base station 501, a user equipment 502 and a target base station 503. The base station 501 comprises:

a module 504 for selecting one of said plurality of base stations as a target base station 503 for a handover of said user equipment. The base station 501 makes for example the selection based on a measurement report of neighboring base station received from the user equipment 502, or from previous handovers that the base station 501 has accomplished.

a module 505 for transmitting a handover request to said target base station 503. The handover request being sent via an X2 interface that couples the base station 501 with the target base station 503.

a module 506 for receiving a handover request acknowledgement from said target base station 503, said handover request acknowledgment being indicative of at least one physical resource of said target base station 503. The at least one physical resource indicated in the handover request acknowledgement is not used, or used with a reduced transmission power by the target base station 503 during the transmission of the handover command.

a module 507 for transmitting a handover command to said user equipment 502 via said communication link using said at least one physical resource. The handover command is descriptive of information required for accessing said target base station 503. As the target base station is not using the at least one physical resource, or using it with a reduced transmission power, the interference between the base station 501 and the target base station 503 is reduced.

a computer program product 508 stored on a storage medium, comprising executable program means for causing the base station 501 to perform a method according to any of the preceding embodiments when the program is run on the base station 503.

LIST OF REFERENCE NUMERALS

100 Flowchart
101 First step
102 Second step
103 Third step
104 Fourth step
200 Diagram
201 Base station
202 User equipment
203 Target base station
204 Handover request
205 Handover request acknowledgement
206 Handover command
300 Block diagram
301 Base station
302 Target base station
303 Set of physical resource blocks
304 Set of physical resource blocks
305 First selection of PRB
400 Block diagram
401 Second selection of PRB
500 block diagram
501 Base station
502 User equipment
503 Target base station
504 Module
505 Module
506 Module
507 Module
508 Computer Program Product

The invention claimed is:

1. A telecommunication method comprising:
selecting one of a plurality of base stations of a mobile communication system as a target base station for a handover of a user equipment from a first base station of the plurality of base stations to the target base station, wherein the first base station has a previously established communication link with the user equipment and performs the selecting;
transmitting a handover request from the first base station to said target base station, wherein the handover request includes physical resource information to be used by the first base station for transmitting a handover command to the user equipment, wherein the target base station uses the physical resource information to not transmit the physical resources during transmission of the handover command or to transmit the physical resources at reduced transmission power during transmission of the handover command;
receiving a handover request acknowledgement from said target base station at the first base station, said handover request acknowledgment being indicative of at least one physical resource of said target base station, wherein a description of the at least one physical resource is decoded using a modulo operation with a temporary identifier of the user equipment, wherein the at least one physical resource is a physical resource block, wherein the modulo operation decodes a first block position of the physical resource block in at least a predefined digit position from the temporary identifier, wherein the at least one physical resource is selected for minimizing interference with the target base station during the transmission of the handover command; and
transmitting the handover command to said user equipment via said communication link, the communication link being previously established via said at least one physical resource, said handover command being descriptive of information required for accessing said target base station.

2. The telecommunication method of claim 1, wherein said physical resource being at least one of frequency spectrum, time slot, physical resource block or antenna beam.

3. The telecommunication method of claim 1, wherein said physical resource block is not transmitted by said target base station during said transmission of said handover command.

4. The telecommunication method of claim 1, wherein said handover request acknowledgment is further indicative of a block position of said physical resource block, wherein said handover command is transmitted at said block position of said physical resource block.

5. The telecommunication method of claim 1, wherein said handover request comprises physical resource information to be used by said first base station during transmission of said handover command, wherein said target base station uses said physical resource information for transmitting said physical resources with reduced transmission power during said transmission of said handover command.

6. The telecommunication method of claim 1, wherein said mobile communication system is a frequency reuse-1 multi-carrier system.

7. A base station, comprising:
a processor configured to select one of a plurality of base stations of a mobile communication system as a target base station for a handover of a user equipment to the target base station while the base station has a previously established communication link with the user equipment;
a transmitter configured to transmit a handover request to the target base station, wherein the handover request includes physical resource information to be used for transmitting a handover command to the user equipment, wherein the target base station uses the physical resource information to not transmit the physical resources during transmission of the handover command or to transmit the physical resources at reduced transmission power during transmission of the handover command; and
a receiver configured to receive a handover request acknowledgement from the target base station, the handover request acknowledgment being indicative of at least one physical resource of the target base station, wherein a description of the at least one physical resource is decoded using a modulo operation with a temporary identifier of the user equipment, wherein the at least one physical resource is a physical resource block, wherein the modulo operation decodes a first block position of the physical resource block in at least a predefined digit position from the temporary identifier, wherein the at least one physical resource is selected for minimizing interference with the target base station during the transmission of the handover command; and wherein the transmitter is configured to transmit the handover command to the user equipment via the communication link, the communication link being previously established via the at least one physical resource, the handover command being descriptive of information required for accessing the target base station.

8. A non-transitory computer-readable storage medium storing program instructions that, when executed by a processor, cause a base station to perform a telecommunication method, the method comprising:

selecting one of a plurality of base stations of a mobile communication system as a target base station for a handover of a user equipment from a first base station of the plurality of base stations to the target base station, wherein the first base station has a previously established communication link with the user equipment and performs the selecting;

transmitting a handover request from the first base station to the target base station, wherein the handover request includes physical resource information to be used by the first base station for transmitting a handover command to the user equipment, wherein the target base station uses the physical resource information to not transmit the physical resources during transmission of the handover command or to transmit the physical resources at reduced transmission power during transmission of the handover command;

receiving a handover request acknowledgement from the target base station at the first base station, the handover request acknowledgment being indicative of at least one physical resource of the target base station, wherein a description of the at least one physical resource is decoded using a modulo operation with a temporary identifier of the user equipment, wherein the at least one physical resource is a physical resource block, wherein the modulo operation decodes a first block position of the physical resource block in at least a predefined digit position from the temporary identifier, wherein the at least one physical resource is selected for minimizing interference with the target base station during the transmission of the handover command; and transmitting the handover command to the user equipment via the communication link, the communication link being previously established via the at least one physical resource, the handover command being descriptive of information required for accessing the target base station.

9. The base station of claim 7, wherein the physical resource being at least one of frequency spectrum, time slot, physical resource block or antenna beam.

10. The base station of claim 7, wherein the physical resource block is not transmitted by the target base station during the transmission of the handover command.

11. The base station of claim 7, wherein the handover request acknowledgment is further indicative of a block position of the physical resource block, wherein the transmitter is configured to transmit the handover command at the block position of the physical resource block.

12. The base station of claim 7, wherein the handover request comprises physical resource information to be used during transmission of the handover command, wherein the target base station uses the physical resource information for transmitting the physical resources with reduced transmission power during the transmission of the handover command.

13. The base station of claim 7, wherein the mobile communication system is a frequency reuse-1 multi-carrier system.

* * * * *